Jan. 8, 1935. J. GENOVESE 1,987,529
LIFTING JACK
Filed April 25, 1934 3 Sheets-Sheet 3
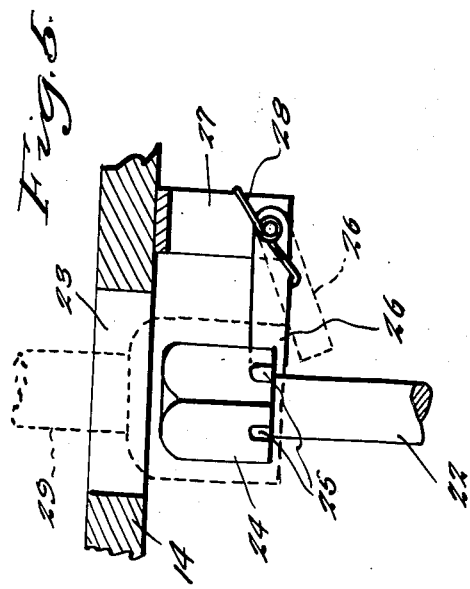
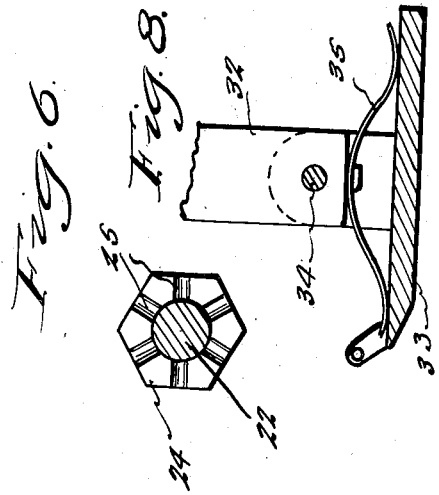
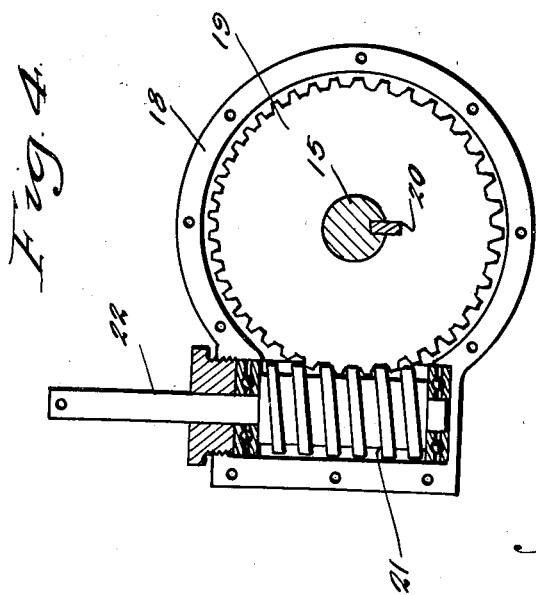
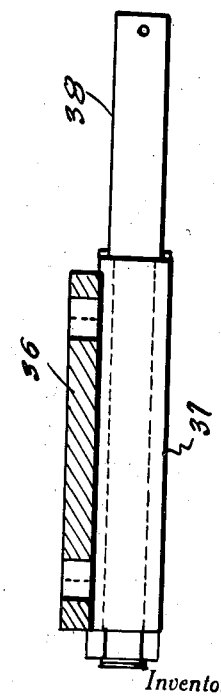
Inventor
Joseph Genovese
By Clarence A. O'Brien
Attorney Patented Jan. 8, 1935

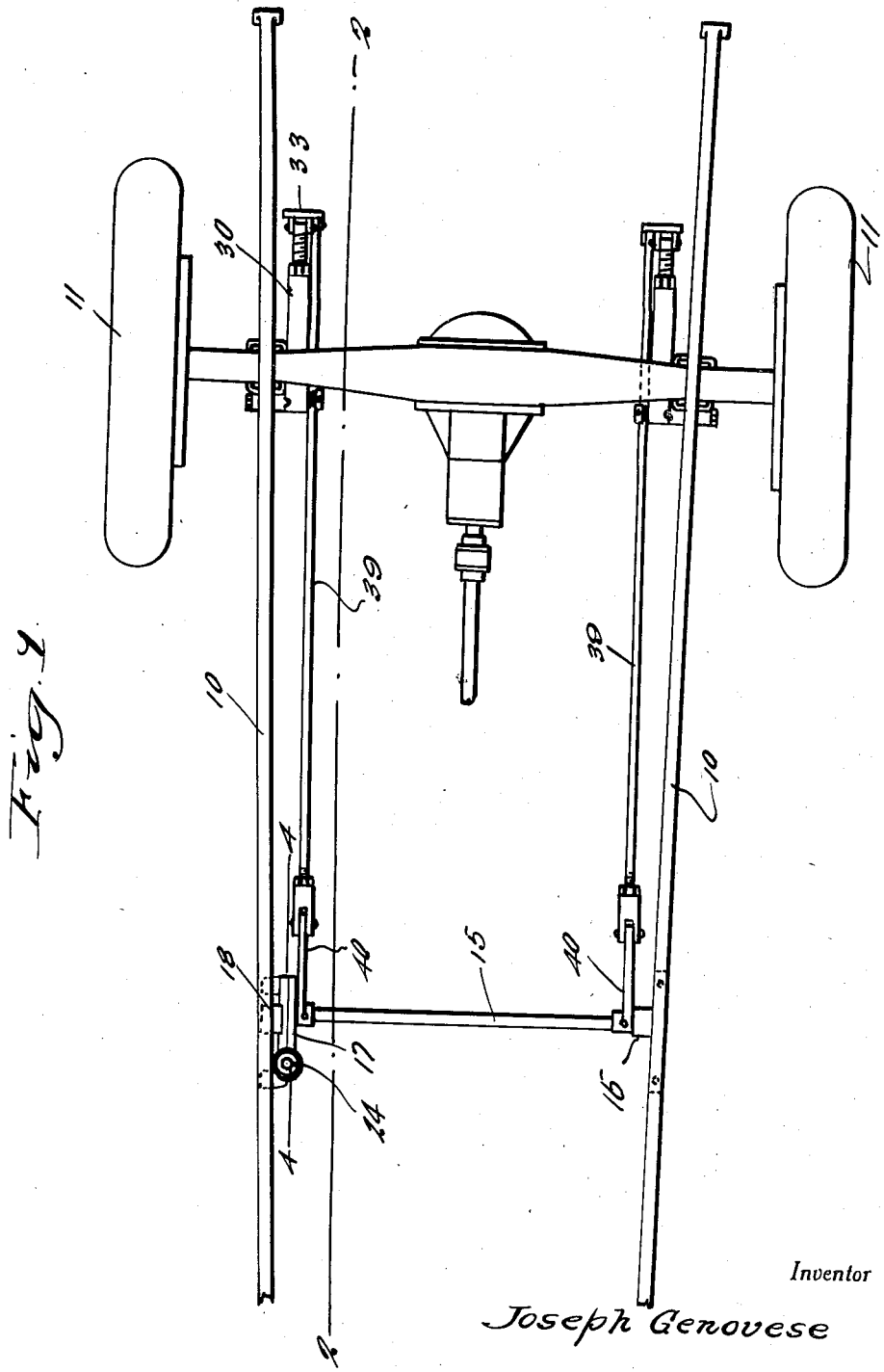

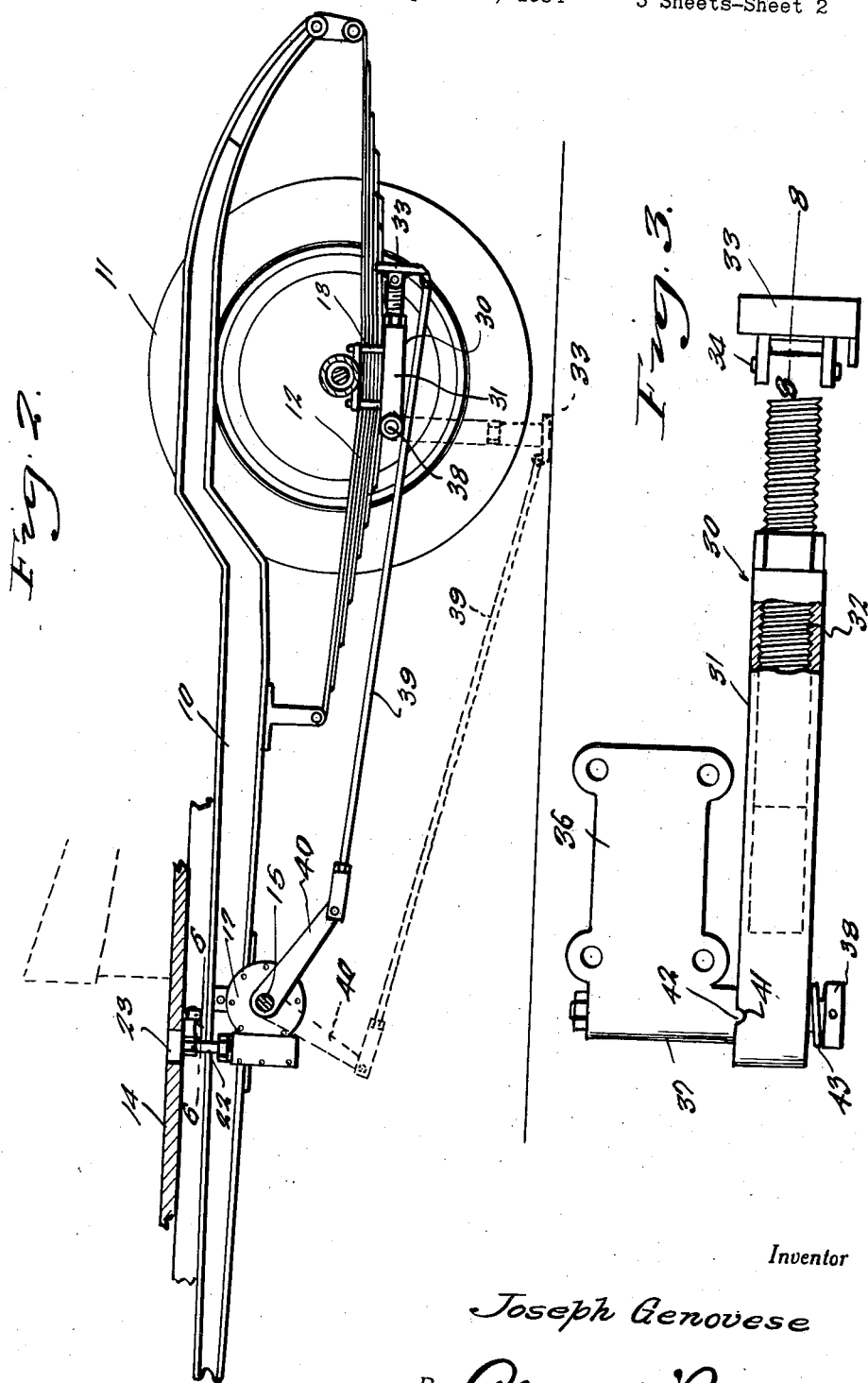

1,987,529

UNITED STATES PATENT OFFICE 1,987,529

LIFTING JACK

Joseph Genovese, Great Neck, N. Y.

Application April 25, 1934, Serial No. 722,373

2 Claims. (Cl. 254—86)

This invention has reference to lifting jacks and has as its object the provision of an attachment in the form of a lifting jack which may be readily applied to an automobile for use therewith as a part of its equipment.

Further objects of the invention are to provide an attachment in the form of a lifting jack for vehicles which is of economical and practical construction and operation.

A still further object of the invention is to facilitate the ordinarily disagreeable task of lifting one end of a road vehicle off the ground.

The invention together with its objects and advantages will be best understood from a study of the following description taken in connection with the accompanying drawings wherein:

Figure 1 is a plan view illustrating the application of the invention.

Figures 2 and 4 are sectional views taken substantially on the lines 2—2 and 4—4 respectively of Figure 1.

Figure 3 is a plan view of one of the jack members partially broken away and shown in section.

Figure 5 is an enlarged detail view showing how access may be had to the device for operating it.

Figure 6 is a detail view taken substantially on the line 6—6 of Figure 2.

Figure 7 is a detail view of the attaching bracket for a jack member, and

Figure 8 is a sectional view taken substantially on the line 8—8 of Figure 3.

Referring to the drawings by reference numerals it will be seen that the chassis bars of the automobile are indicated by the reference numeral 10, the rear wheel by the reference numeral 11, the rear springs by the reference numerals 12, the U-bolts forming part of the clamps for the springs by the reference numeral 13, and a portion of the floor board of the automobile by the reference numeral 14.

In accordance with the present invention the jack attachment comprises an operating shaft 15 that extends between the bars 10 and has its ends suitably journalled in bearings 16 provided therefor. Adjacent one end thereof the shaft 15 extends through a gear casing 17 that is supported from the adjacent frame bar 10 through the medium of suitable bracket means 18. Arranged within the gear case 17 is a gear 19 that is secured to the shaft 15 for rotation therewith by any suitable key means and as indicated generally at 20 in Figure 4.

The gear 19 is in constant mesh with a worm gear 21 arranged in a suitable chamber provided therefor in the casing 17 and provided on one end of a vertical shaft 22. The shaft 22 is in alinement with an opening 23 provided in the floor board 14, and at said upper end the shaft 22 is provided with a non-circular head 24 the under face of which is provided with radial grooves 25 as will be clear from a study of Figure 6. For locking the shaft 22 against casual rotation there is provided a latch member 26 pivoted at one end to a bracket 27 secured to the underside of the floor board 15. The latch member 26 is normally urged upwardly into engagement with one of the grooves 25 through the medium of a spring 28.

The head 24 of the shaft 22 is of a size and shape to accommodate the usual socket wrench forming part of the usual tool equipment, said wrench being indicated by a broken line in Figure 5, and by the reference numeral 29. It will thus be seen that the socket of the wrench 29 may be passed downwardly through the opening 23, engaged with the head 24, and the shaft 22 rotated whereby through the medium of the gearing 21 and 19 the shaft 15 is rotated in the proper direction for swinging the jacks 30 from the full line position shown in Figure 2 to the dotted line position shown in said figure, or vice versa.

Each of the jacks 30 includes a tubular member 31 with which is screw threaded a stem 32 provided at its free end with a foot 33 pivoted to the stem 32 as at 34 and normally retained in a position at right angles to the stem 32 through the medium of a leaf spring 35 all of which will be clear from a study of Figures 3 and 8.

For each jack there is provided an attaching plate 36 which is suitably apertured to accommodate the U-bolts 13 of a clamp provided for a spring 12. Plate 36 at one end is formed with a bearing sleeve 37 which accommodates one end of a pivot pin or shaft 38. The member 31 of the jack is provided with a transverse opening at its free end for pivotal engagement with the shaft 38 so that it will be seen the jack is supported in a manner to swing to the operative or dotted line position in Figure 2 from the full line or ineffective position shown in said figure, or vice versa.

The feet 33 of the jacks are connected by rods 39 with arms 40 provided on the shaft 15 so that rocking movement of the shaft 15 is transmitted to the jacks for swinging the same into and out of operative position.

For releasably locking the jack in the out of the way or inoperative position shown in full lines in Figure 2 each jack has the pivoted end thereof provided with a lateral notch 41 with which is engageable a lug 42 provided at one end edge of the bearing sleeve 37, and a spring 43 provided on the shaft 38 between the head thereof and an adjacent side of the member 31 of the jack normally urges said member and part of the jack toward the sleeve 37 to engage the notch 41 and lug 42.

It is thought that a clear understanding of the construction, utility and operation of a device of this character will be had, and a more detailed description is therefore deemed unnecessary.

Having thus described my invention, what I claim as new is:

1. In an automobile, the combination with axle springs, frame members and floor board, of brackets secured to the axle springs, jacks pivotally connected with the brackets, a shaft rotatably supported between the frame members, operating connections between the shaft and the jack for swinging the latter, a gear case fixedly supported from one of the frame members and through which the shaft extends, a gear in the case and secured to the shaft for rotation therewith, a vertical worm gear in the case and meshing with the first named gear, a shaft forming part of said worm gear extending vertically upwardly from the gear case, and said floor board having an opening through which access may be had to the vertical shaft for rotating the latter, said vertical shaft having a head on its upper end to accommodate an operating tool, said head being provided with a circular series of notches, and a latch pivotally mounted beneath the floor board and engageable with a selected one of the notches for releasably securing the vertical shaft against rotative movement.

2. A jack structure for a motor vehicle comprising an operating shaft extending transversely of the vehicle, operating connections between the shaft and a jack positioned adjacent the wheel of the vehicle, manually operated gearing for rotating the operating shaft in either direction including a shaft having a head adapted to accommodate an operating tool and also having a series of spaced notches, and a pivoted spring pressed latch member engageable with a selected one of the notches for releasably securing the head equipped shaft against rotation, said latch member being movable out of engagement with the notch of the head by contact of the tool with the latch in the application of the tool to the head of said shaft.

JOSEPH GENOVESE.